(12) United States Patent
Johnson et al.

(10) Patent No.: US 11,085,705 B2
(45) Date of Patent: Aug. 10, 2021

(54) ENERGY STORAGE AND RETRIEVAL SYSTEM

(71) Applicant: 1414 Degrees Limited, Adelaide (AU)

(72) Inventors: Matthew Johnson, Adelaide (AU);
Jonathan Whalley, Adelaide (AU);
Nathan Levinson, Adelaide (AU);
Chad Taylor, Adelaide (AU)

(73) Assignee: 1414 Degrees Limited, Adelaide (AU)

( * ) Notice: Subject to any disclaimer, the term of this patent is extended or adjusted under 35 U.S.C. 154(b) by 0 days.

(21) Appl. No.: 16/494,344

(22) PCT Filed: Mar. 23, 2018

(86) PCT No.: PCT/AU2018/000043
§ 371 (c)(1),
(2) Date: Sep. 16, 2019

(87) PCT Pub. No.: WO2018/170533
PCT Pub. Date: Sep. 27, 2018

(65) Prior Publication Data
US 2020/0018557 A1 Jan. 16, 2020

(30) Foreign Application Priority Data
Mar. 23, 2017 (AU) .................. 2017901040

(51) Int. Cl.
*F28D 20/02* (2006.01)
*F28D 20/00* (2006.01)
*C09K 5/06* (2006.01)

(52) U.S. Cl.
CPC .............. *F28D 20/025* (2013.01); *C09K 5/06* (2013.01); *F28D 20/0056* (2013.01)

(58) Field of Classification Search
CPC ...... F28D 20/02; F28D 20/021; F28D 20/025; F28D 20/0056; F28D 2020/0021; C09K 5/06; F02C 6/14
See application file for complete search history.

(56) References Cited

U.S. PATENT DOCUMENTS 5,441,097 A * 8/1995 Kanda ................ F28D 20/0034
165/10
6,289,666 B1 9/2001 Ginter
(Continued)

FOREIGN PATENT DOCUMENTS

| DE | 102007023766 B4 | 12/2010 |
|---|---|---|
| JP | S6285136 A | 4/1987 |
| JP | 2016217664 A | 12/2016 |

OTHER PUBLICATIONS

Böyük, "Physical and Mechanical Properties of Al—Si—Ni Eutectic Alloy", Metals and Materials International, 2012, pp. 933-938, vol. 18, No. 6.

*Primary Examiner* — Mark A Laurenzi
*Assistant Examiner* — Xiaoting Hu
(74) *Attorney, Agent, or Firm* — The Webb Law Firm (57) ABSTRACT

An energy storage and retrieval system is disclosed. The system includes a heat generating layer for generating thermal energy based on input electrical energy, a thermal energy storage layer located to receive thermal energy from the heat generating layer, the thermal energy storage section layer including a thermal energy storage material to store thermal energy. The system also includes a thermal energy retrieval layer thermally connectable to the thermal energy storage material and configurable to retrieve thermal energy from the thermal energy storage layer where the heat generating layer and the thermal energy retrieval layer are separated by the thermal energy storage layer.

28 Claims, 8 Drawing Sheets

(56) References Cited

U.S. PATENT DOCUMENTS

| | | |
|---|---|---|
| 2009/0199998 A1 | 8/2009 | Shimozono |
| 2011/0120669 A1 | 5/2011 | Hunt |
| 2011/0219771 A1* | 9/2011 | Stiesdal ............... F28D 20/021 |
| | | 60/670 |
| 2011/0271948 A1 | 11/2011 | Redford |
| 2012/0319410 A1 | 12/2012 | Ambrosek et al. |
| 2013/0340432 A1* | 12/2013 | Hunt ........................ F01K 3/00 |
| | | 60/643 |
| 2014/0109895 A1* | 4/2014 | Ren ........................ F28D 20/02 |
| | | 126/714 |
| 2014/0366536 A1 | 12/2014 | Muren |
| 2015/0053367 A1* | 2/2015 | Parkinson ................. F28F 7/02 |
| | | 165/10 |
| 2015/0256119 A1* | 9/2015 | Datas Medina ........ H02S 10/30 |
| | | 136/253 |
| 2015/0266144 A1* | 9/2015 | Bengaouer ............. B23P 15/26 |
| | | 165/10 |
| 2016/0201996 A1 | 7/2016 | Conry |
| 2016/0363387 A1* | 12/2016 | Stapleton ................. F28F 3/12 |

* cited by examiner

ENERGY STORAGE AND RETRIEVAL SYSTEM

CROSS-REFERENCE TO RELATED APPLICATIONS

This Application is the United States National Phase of International Application No. PCT/AU2018/000043 filed Mar. 23, 2018, and claims priority to Australian Provisional Patent Application No. 2017901040 filed Mar. 23, 2017, the disclosures of which are hereby incorporated by reference in their entirety.

TECHNICAL FIELD

The present disclosure relates to the storage and retrieval of energy. In a particular form, the present disclosure relates to the storage of input electrical energy as thermal energy and the retrieval of this thermal energy for energy recovery purposes.

BACKGROUND

With the advent of renewable energy sources such as wind and solar power whose electrical output will vary substantially with local environmental conditions conventional electrical grid systems must now adapt to energy sources that are intermittent. As such, these renewable sources are in of themselves unable to provide a reliable energy source for base load power particularly in times of high demand. Conversely, it is also often the case that surplus electrical energy may be generated from renewable energy sources over and above the load requirements at any given time due to favourable environmental conditions. This intermittent nature of renewable energy sources has, to some degree, constrained the adoption of these "clean" energy sources in large scale electrical grid supply systems where the reliable delivery of base load power is a critical requirement. As a consequence, there has been a focus on developing energy storage arrangements which are designed to store surplus generated electrical energy which may then be retrieved at a later time and which can provide a suitable energy source for base load power.

One approach is the direct storage of electrical energy by electrical and magnetic storage arrangements such as supercapacitors or superconducting magnetic energy storage. However, these direct storage arrangements support only low rated energy capacity and short duration storage which is inappropriate for bulk storage over 1 hour necessary for larger scale electricity consumption.

The other approach is the indirect storage of electrical energy where the electrical energy is first converted into mechanical, chemical or thermal energy. Chemical storage such as batteries are a mature technology; however, they are limited by relatively short (10 year) lifetimes. Hydrogen fuel cells are an emerging chemical storage technology; however, these devices typically have low efficiency and a similarly limited (10 year) lifetime. Mechanical storage in the form of pumped hydro energy storage is mature, offers high capacity, efficiency and lifetime; however, these arrangements are limited to regions with appropriate geography incorporating suitable water reservoirs. Compressed air energy systems can offer high capacity, up to 1 day discharge and potentially long lifetimes; however, larger scale systems are again limited by appropriate geography with the requirement for suitable air reservoirs. These large scale mechanical storage methods also suffer from a lack of economic scalability to rated energy capacities below 100 MW and further require large scale capital investment.

Thermal energy storage systems that employ the heat absorption and emission properties that occur when a thermal energy storage material undergoes a phase transition such as transitioning from a solid to a liquid on heating and back to a solid on cooling have shown some promise due to their characteristic of maintaining an almost constant temperature. In these cases, it is important to select the appropriate thermal energy storage material to match the energy recovery system that will harness the retrieved thermal energy from the thermal energy storage material.

One difficulty with these types of systems is that the thermal energy storage material may change its volume as it changes phase and this often results in difficulties in containerisation of the material. In general, higher temperature phase transitions are desirable as they provide useable heat across a wider range of energy recovery devices as the thermal supply can always be reduced but on the other hand it cannot be increased above the maximum operating temperature of the phase transition. However, the adoption of higher operating temperature also increases the stresses on the system and as a result complicates system design, especially component material selection and configuration.

In one example, silicon has been indicated as a potential thermal energy storage material as it has excellent thermal storage properties as it transitions from a solid to a liquid phase. Silicon has one of the highest latent heat capacities of any material, and hence a very high energy density when compared to alternative phase change materials such as molten salts. Additionally, the high melting temperature of approximately 1414° C. provides a greater thermal head to drive a heat engine when compared to other alternatives which operate in the 300-600° C. range. This high operating temperature will also in general improve the efficiency of the heat engine when it is operating to convert the stored heat to other forms of energy. Silicon is also abundant as well as being non-toxic and completely recyclable.

Unfortunately, silicon has the further property that it expands on solidification. This volume change, combined in the case of silicon with the required high operating temperatures, has meant that containerisation of the thermal energy storage material and the associated structural design of any storage and retrieval system has involved additional difficulties. As a result, the implementation of a readily scalable and modular thermal energy storage and retrieval system that is able to meet commercial requirements based on the latent heat storage properties of high temperature phase change materials such as silicon has been very challenging.

SUMMARY

In a first aspect, the present disclosure provides an energy storage and retrieval system comprising:

a heat generating layer for generating thermal energy based on input electrical energy;

a thermal energy storage layer located to receive thermal energy from the heat generating layer, the thermal energy storage layer including a thermal energy storage material to store thermal energy; and a thermal energy retrieval layer thermally connectable to the thermal energy storage material and configurable to retrieve thermal energy from the thermal energy storage layer, wherein the heat generating layer and the thermal energy retrieval layer are separated by the thermal energy storage layer.

In another form, the heat generating layer is disposed substantially above the thermal energy storage layer.

In another form, the thermal energy storage layer is disposed substantially above the thermal energy retrieval layer.

In another form, the heat generating layer, the thermal energy storage layer and the thermal energy retrieval layer form substantially parallel layers with respect to each other.

In another form, the heat generating layer includes one or more resistive heating elements.

In another form, the thermal energy storage layer includes one or more open-topped containers for containing the thermal energy storage material.

In another form, the container is configured to encourage the high temperature phase change material to expand upwards on cooling.

In another form, the thermal energy retrieval layer is thermally connected to a base of the one or more open-topped containers.

In another form, the thermal energy retrieval layer is configured to operate at a lower temperature than the thermal energy storage layer.

In another form, the thermal energy retrieval layer includes a heat conduction arrangement to conduct heat from the thermal energy storage layer and a fluid conveying arrangement for conveying heat transfer fluid to retrieve the heat conducted from the heat conduction arrangement.

In another form, the fluid conveying arrangement is a fluid circulation arrangement for circulating heat transfer fluid to retrieve the heat conducted from the heat conduction arrangement.

In another form, the heat conduction arrangement is configured to induce turbulence in a flow of the heat transfer fluid.

In another form, the heat conduction arrangement includes a plurality of heat conduction members that in operation extend into the moving heat transfer fluid.

In another form, the thermal energy storage material is silicon.

In another form, the thermal energy storage material is a eutectic material.

In another form, the thermal energy storage material is a silicon based eutectic material.

In another form, the silicon based eutectic material is Aluminium-Silicon-Nickel eutectic.

In another form, the system operates in a storage mode, wherein electrical energy is input into the heat generating layer to generate thermal energy to heat the thermal energy storage material of the thermal energy storage layer to store the thermal energy.

In another form, the thermal energy storage material changes phase on heating.

In another form, the system operates in a retrieval mode, wherein the thermal energy retrieval layer is configured to operate at a lower temperature than the thermal energy storage material to conduct heat from the thermal energy storage material.

In another form, the system operates in a storage/retrieval mode wherein electrical energy is input into the heat generating layer to generate thermal energy to heat the thermal energy storage material of the thermal energy storage layer to store the thermal energy and wherein concurrently the thermal energy retrieval layer is configured to operate at a lower temperature than the thermal energy storage material to conduct heat from the thermal energy storage material.

In another form, the system includes an energy recovery system to recover the retrieved thermal energy.

In another form, the energy recovery system and the energy storage and retrieval system operate together in a closed loop system.

In another form, the system includes a fluid circulating means to circulate the heat transfer fluid.

In another form, the energy recovery system includes a turbine arrangement.

In a second aspect, the present disclosure provides a method for storing and retrieving electrical energy, including converting in a heat generating layer the electrical energy to thermal energy;

storing the thermal energy by heating a thermal energy storage layer comprising a thermal energy storage material; and retrieving the stored thermal energy by thermally connecting the thermal energy storage material to a thermal energy retrieval layer, wherein the heat generating layer and the thermal energy retrieval layer are separated by the thermal energy storage layer.

In another form, converting the electrical energy to thermal energy includes generating thermal energy above the thermal energy storage material.

In another form, retrieving the stored thermal energy includes operating the thermal energy retrieval layer at a lower temperature compared to the thermal energy storage layer.

In another form, the thermal energy storage material of the thermal energy storage layer is contained in one or more open-topped containers.

In another form, retrieving the stored thermal energy includes thermally connecting the thermal energy retrieval layer to a base of the one or more open-topped containers.

In another form, operating the thermal energy retrieval layer at a lower temperature includes conveying a heat transfer fluid through the thermal energy retrieval layer to retrieve the stored thermal energy from the thermal energy storage layer.

In another form, conveying a heat transfer fluid through the thermal energy retrieval layer includes circulating the heat transfer fluid through the thermal energy retrieval layer.

In another form, storing the thermal energy includes causing a phase change in the thermal energy storage material.

In another form, the steps of storing the thermal energy and retrieving the stored thermal energy occur concurrently.

In another form, the method includes recovering the retrieved stored thermal energy.

In another form, the steps of retrieving the stored thermal energy and recovering the retrieved stored thermal energy operate in a closed loop.

In a further aspect, the present disclosure provides a container for storing a high temperature phase change material that expands on cooling and solidification from a molten state, the container comprising an open top to allow heating of the high temperature phase change material from above, wherein the container is configured to encourage the high temperature phase change material to expand upwards on cooling.

In another form, the container includes a base and side walls and is configured to encourage the high temperature phase change material to expand upwards on cooling by tapering the side walls of the vessel outwardly from the base.

In another form, the container is shaped as an open-topped inverted truncated pyramid.

In another form, the container is configured to promote the high temperature phase change material to expand upwards on cooling by incorporating rounded edges in the vessel.

In another form, the base of the container is configured to promote cooling from the base of the container so that solidification of the thermal energy storage material occurs preferentially at the base of the vessel.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Figure 1:
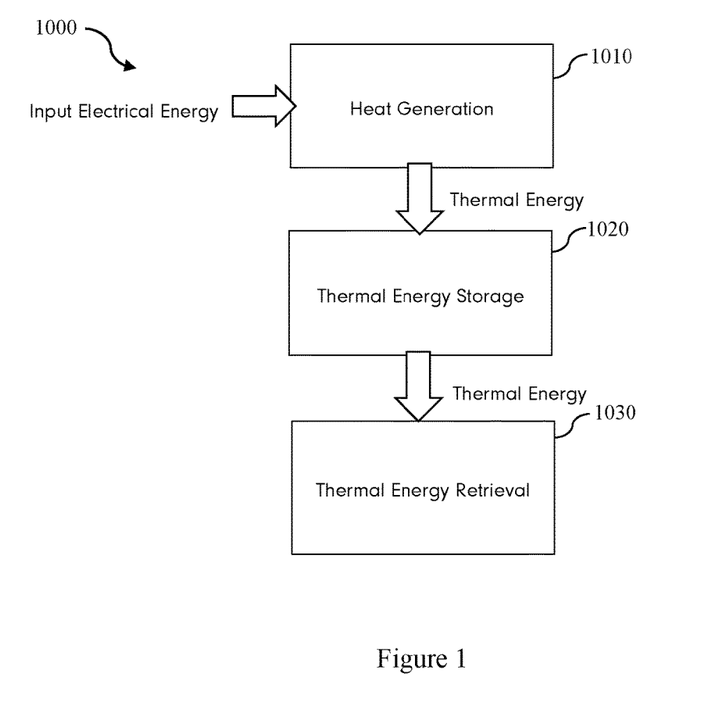
FIG. 1 is a system overview diagram of an energy storage and retrieval system in accordance with an illustrative embodiment.
Figure 2:
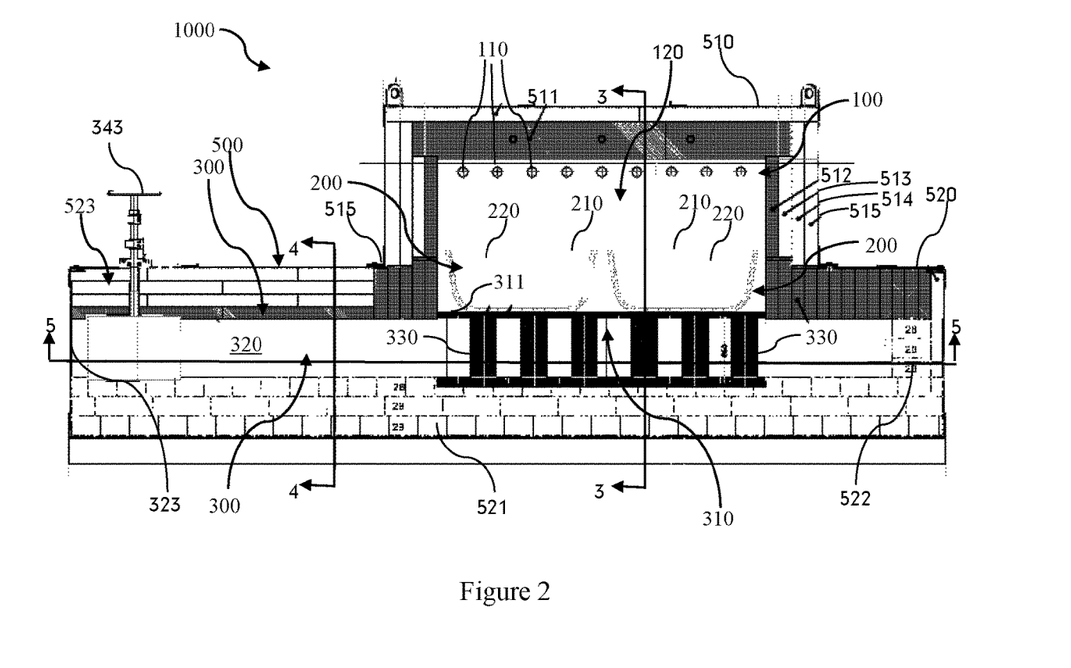
FIG. 2 is a side sectional view of an energy storage and retrieval system in accordance with another illustrative embodiment.
Figure 3:
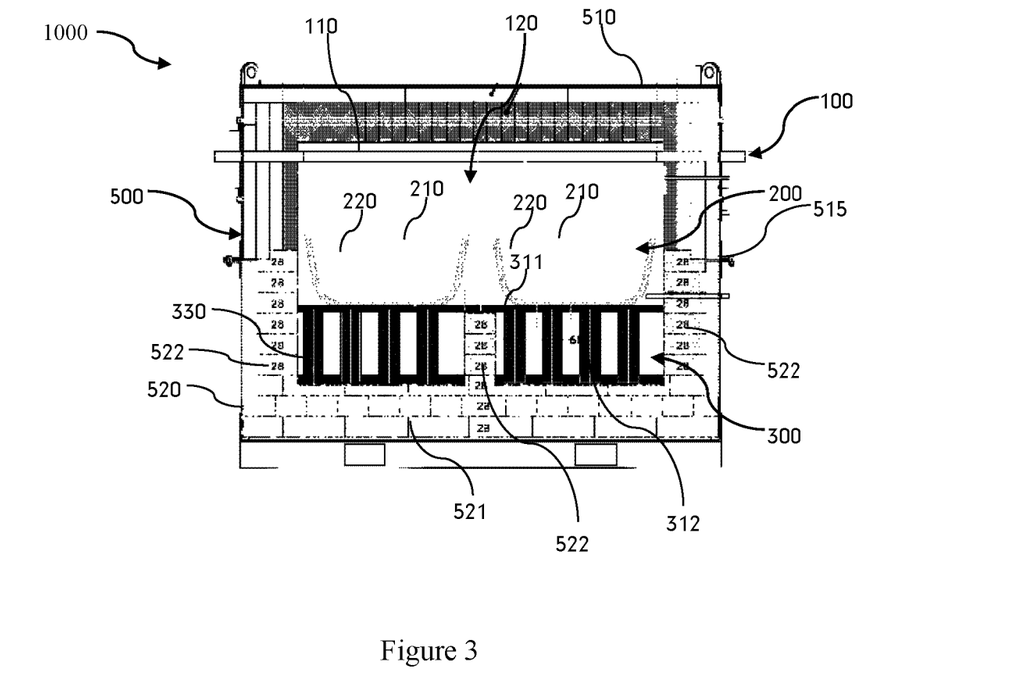
FIG. 3 is a front sectional view of the energy storage and retrieval system illustrated in FIG. 1 through section 3-3.
Figure 4:
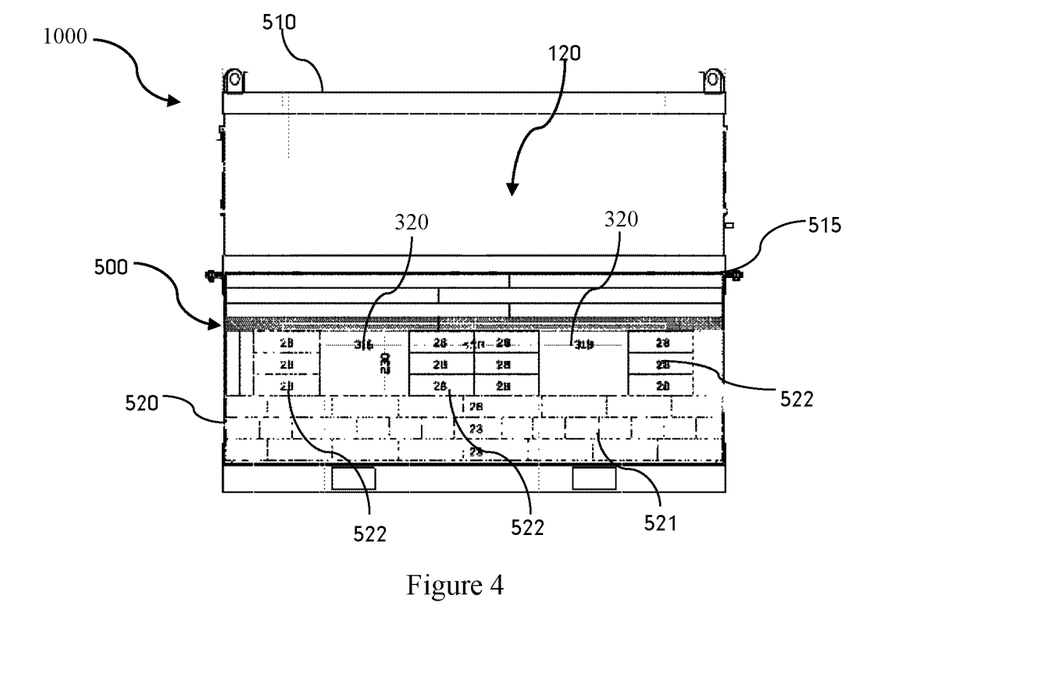
FIG. 4 is a front sectional view of the energy storage and retrieval system illustrated in FIG. 1 through section 4-4.

Referring now to FIG. 1 there is shown a system overview of an energy storage and retrieval system 1000 according to an illustrative embodiment. Energy storage and retrieval system 1000 comprises a heat generating section 1010 based on input electrical energy, a thermal energy storage section 1020 and a thermal energy retrieval section 1030 for retrieving the stored thermal energy. In this embodiment, the thermal energy storage section 1020 includes a thermal energy storage material which is located to receive thermal energy from heat generating section 1010 in order to store the thermal energy. The thermal energy retrieval system 1030 is thermally connected to the thermal energy storage material and is further configurable to retrieve thermal energy from the thermal energy storage section 1020.

On suitable heating, the thermal energy storage material begins to change phase as a temperature of the thermal energy storage material transitions above a phase transition temperature of the material in order to store the thermal energy. When the thermal energy retrieval section 1030 is configured to operate at a lower temperature than the thermal energy storage material, thermal energy will be released from the thermal energy storage material and conducted into the cooler thermal energy retrieval section 1030 for retrieval.

The energy storage and retrieval system 1000 may be operable in three modes. The first mode is a storage mode where the electrical input energy is inputted into the heat generating section 1010 causing heating of and eventual phase change of the thermal energy storage material to store the thermal energy. In this mode, the thermal energy retrieval system 1030 is configured such that there is no substantive temperature difference between it and the thermal energy storage material. In another example, the thermal energy retrieval section 1030 may be selectively thermally isolated or insulated from the thermal energy storage section 1020 to prevent the transfer of thermal energy between these sections.

The second mode is a retrieval mode, where the thermal energy retrieval system 1030 is configured to be thermally connected to thermal energy storage section 1020 and to operate at a lower temperature than the thermal energy storage material and thermal energy will be conducted from the thermal energy storage material for retrieval in the thermal energy retrieval section 1030.

The third mode is a combined storage/retrieval mode where the heat generating section 100 is operable to heat the thermal energy storage material in the thermal energy storage section 1020 and the thermal energy retrieval section 1030 is configured to be thermally connected and operate at a lower temperature than the thermal energy storage material to conduct thermal energy for retrieval.

Referring now to FIGS. 2 to 6, there are shown various views of an energy storage and retrieval system 1000 according to another illustrative embodiment. In this illustrative embodiment, the heat generating section 1010, thermal energy storage section 1020 and thermal energy retrieval section 1030 are configured respectively as a heat generating layer 100, a thermal energy storage layer 200 and a thermal energy retrieval layer 300 where the heat generating layer 100 and the thermal energy retrieval layer 300 are separated by the thermal energy storage layer 200. In this embodiment form, this is arranged by configuring these layers as substantially parallel layers with respect to each other to together form an assembly structure 500 formed within a shell of heat resistant material.

In this embodiment, the heat generating layer 100 comprises a number of longitudinally extending spaced apart parallel horizontal electrical heating elements 110 each housed in a ceramic sleeve that receives input electrical energy in the form of electric current. As would be appreciated, the input electric energy may be from any combination of intermittent or continuous, renewable or non-renewable energy sources.

As would be appreciated, other configurations of the heating elements may be adopted including, vertically suspending or hanging the straight rod heating elements. In another embodiment, the heating elements could be U- or serpentine shaped and arranged either vertically or horizontally throughout the heat generating section 100. In yet another embodiment, involving lower phase transition temperatures, (eg, less than 1100° C.) a heating wire may be employed which could be either straight or coiled or have a non-regular configuration.

In a further embodiment, the heat generating layer 100 may include an induction heating arrangement for inductive heating of the phase change material by a generated electromagnetic field. In one example, a copper coil may be employed to produce the required oscillating electromagnetic field. While induction heating may provide quicker heating and the creation of mixing currents (convection) in the environment of the heat generating layer 100, it will however generally also require a coolant system to maintain the current carrying coil at a suitable temperature and may also increase the external temperature of the heat generating layer 100.

Thermal energy storage layer 200 includes one or more open containers 210 containing a thermal energy storage material 220 which begins to change phase as the temperature of the thermal energy storage material 220 transitions above a phase transition temperature to store thermal energy and to release thermal energy when the thermal energy storage material 220 is thermally connected to in this embodiment a cooler thermal energy retrieval layer 300 when system 1000 is operating in the second retrieval mode or combined storage/retrieval mode.

In one example, the thermal energy storage material 220 is silicon which has a phase transition temperature of approximately 1414° C. Silicon's latent heat capacity is 1807 kJ/kg which equates to approximately 500 kilowatt hours (kWh) per tonne. In general, it is more efficient to maintain the energy storage and retrieval system 1000 at the phase transition temperature and operate purely in the latent heat phase (ie, between phase transition and complete melting). In some applications, however, the system 100 may be configured to provide heat/electricity at lower efficiencies. In this case, the sensible heat originally used to heat the thermal energy storage material 220 from room temperature may be retrieved and the thermal energy storage material 220 allowed to cool to ambient temperature as thermal energy is released and retrieved when the system 1000 is operating in the second retrieval mode. In this example application, an additional 350 kWh may be retrieved from system 1000 at the expense of operating in a low efficiency range and this will also depend on the type of energy recovery system coupled to the energy storage and retrieval system 1000.

In this embodiment, the heat generating layer 100 is formed within an open ended box portion 510 that is detachable from a base portion 520 of the assembly structure 500 at detachment location 515. In this manner, box portion 510 incorporating the electrical heating elements 110 housed within the ceramic sleeves forms a chamber 120 above the thermal energy storage layer 200. Box portion in this example has a side length of approximately 1700 mm and a height of approximately 700 mm. The ceramic sleeves function to isolate the heating elements 110 from the refractory insulation of the box portion 510 and provide a support so that the heating elements 110 can expand with thermal expansion and further may be removed without requiring the box portion 510 to be removed from the base portion 520.

Given the required phase transition temperature of silicon, this implies an operating temperature of approximately 1450° C.-1550° C. for the heat generating layer 100, including the chamber 120, and thermal energy storage layer 200. Box portion 510 is formed as a multilayer structure comprising an inner layer formed of a high temperature heat resistant material which in this embodiment consists of a refractory material in the form of ceramic fibre board which is selected to withstand the hottest temperature in the heat generating section 100 which in this embodiment is approximately 1550° C. and maintain structural integrity. The roof portion 511 in this embodiment has a thickness of 150 mm and the surrounding inner wall portions 512 each have a thickness of 50 mm. The inner wall portion 512 is surrounded by three intermediate and outer wall portions 513, 514, 515 formed of successive heat resistant materials each rated at progressively lower temperatures. In this illustrative embodiment, the layers or wall portions 513, 514, 515 moving outwardly comprise 2×50 mm thick walls of ceramic fibre board and a final external wall formed from calcite silicate board.

As would be appreciated, the exact configuration of the multilayer heat resistant structure of the box portion 510 may be modified according to the expected operating temperature of chamber 120 and required external temperature of the assembly structure 500. The design requirements of assembly structure 500 are similar in this respect to those of a high temperature oven, kiln or furnace which will specify an internal operating temperature and an external "skin" temperature suitable for the environment. As a general principle, configuring the assembly structure 500, and in particular the box portion 510, which in this example includes the heat generating layer 100 and the thermal energy storage layer 200, to minimise the external temperature will imply that more heat energy is being stored and then usefully retrieved. In this embodiment, the desired external surface temperature of assembly structure 500 is approximately 50° C. but as outlined above this external surface temperature should be kept as low as possible as this reflects the amount of achieved thermal insulation.

Silicon will oxidise readily at elevated temperatures with the onset of oxidation occurring at temperatures above 500° C. This can result in the forming of silicon oxides which then have a higher melting point than pure silicon and as a result potentially reducing the amount of latent heat stored should any oxidation occurs. In this example, box portion 510 is sealed to the base portion 520 of assembly structure 500 and the resultant sealed chamber 120 is filled with an inert gas such as nitrogen before any operation of electrical heating elements 110.

As mentioned previously, silicon has the property that it will expand upon solidification as it releases thermal energy. This has important consequences as the expanding thermal energy storage material 220 will typically induce stresses in any container particularly if there is non-uniform solidification of the material. As a result, standard type containers, such as cylindrical canisters, will be potentially compromised due to the induced stresses resulting from multiple heating and cooling cycles.

In this embodiment, each of the containers 210 is configured to have an open-ended or open-topped inverted rectangular frustum of a pyramid or truncated pyramid-shape. In this example, container 210 further incorporates rounded edges and is formed from heat resistant or refractory materials such as a high-density nitride bonded silicon carbide. In other examples, the container may be formed from other grades of silicon carbide, quartz, alumina, mullite or graphite which as would be appreciated are all materials operable at temperatures above 700° C. This container geometry is configured to reduce the stress on the container during solidification of the silicon as the tapered walls encourage or promote the silicon to expand upwards instead of outwards and as a result reduce the expansive forces on the container walls. This open-ended tapered wall geometry has been found to be more effective than standard canisters having a cylindrical configuration with not only improved stress resistant properties over these types of containers, but also the ability to contain more silicon for an equivalent amount of refractory material used in the construction of the container.

In this embodiment, each container 610 has a 600 mm×600 mm open-ended square top measured to the outside of the container walls, with a wall thickness of 20 mm and an internal wall angle (base to wall) of 110 degrees. Further, each container has a height of 200 mm providing a depth of 180 mm. In another embodiment, each container 610 similarly has a 600 mm×600 mm open-ended square top measured to the outside of the container walls, with a wall thickness of 20 mm but with a height of 250 mm providing a depth of 230 mm. In this example, the internal wall angle is 100 degrees.

As would be appreciated, the container thickness will be a trade-off between required structural rigidity and thermal conductivity of a thinner wall as compared to a thicker wall. In other embodiments, the container may be shaped as a cylindrical section or part-cylinder section having a flattened bottom with a rectangular or square top opening having a trough like configuration.

In one embodiment, the containers 210 contain a sacrificial liner or membrane formed of a material such as graphite card or titanium foil that protects the container 210 from the thermal storage material 220 at the high operating temperatures. This is because at elevated temperatures, silicon can bond with the container wall due to the ingress of molten silicon into micro-cracks and cavities in the refractory material used to construct the container 210. Use of the liner or membrane also allows lower grade and more cost effective refractory material to be employed for container construction than would ordinarily be required for the expected operating temperature.

In another embodiment, one or more of the containers 210 further include a removable graphite sheet cover that assists in reducing the potential oxidation of the silicon and further confines the silicon to container 210 to prevent deposition of the silicon on other potential surfaces within chamber 120 such as roof portion 511, inner wall portions 512, heating elements 110 or the outside of container 210 which may affect the integrity and performance of these components.

In this embodiment, four containers 210 are deployed in a regular 2×2 grid with an expansion gap between each container to allow for thermal expansion. The use of multiple containers distributes the stresses for a given containment volume and also improves redundancy by minimising loss should there be a container fracture as then only one container will require replacement. As would be appreciated, a single container could be used or alternatively, multiple containers deployed in other grid configurations depending on requirements. In another embodiment, the containers 210 may be formed in multiple sub-layers to form a stacked layer arrangement to increase the energy storage capability for a given footprint of the assembly structure 500.

The thermal energy retrieval layer 300 includes a heat conducting arrangement 310 which includes in this embodiment a planar graphite plate 311 which functions to conduct heat from the thermal energy storage material 220 located in containers 210 and a fluid conveying arrangement 320 for the conveying of a heat transfer fluid to absorb and retrieve the thermal energy from the thermal energy storage layer 200 via the heat conducting arrangement 310 where the energy may then be recovered from the heat transfer fluid.

In this embodiment, the fluid conveying arrangement comprises a fluid circulation arrangement 320 comprising a U-shaped heat transfer fluid duct 321 formed in the base portion 520 of assembly structure 500 that when combined with a fluid circulating means such as a high temperature fan located to introduce heat transfer fluid at duct input 322 and an energy recovery device (not shown) located to receive heat transfer fluid at duct output 323 then circulates the heat transfer fluid to form a closed loop system. Base portion 520 in this embodiment is of a generally rectangular box configuration having a length of approximately 3500 mm, a height of approximately 700 mm and a width of approximately 1800 mm.

The core structure of base portion 520 is constructed from bricks formed from alumina or nitride bonded silicon carbide material and includes a base 521 and a wall arrangement 522 that form the side walls of the heat transfer fluid duct 321. The roof 523 of base portion 520 consists of multiple layers of heat resistant material similar to the box portion 510 described above. In this example, base portion 520 further includes a structurally reinforced skin or outer layer formed of steel plates that are welded together.

The U-shaped geometry of the heat transfer fluid duct 321 in this embodiment has been found to promote the overall smooth flow of the heat transfer fluid and as a result reduce the occurrence of hot spots that can affect the lifetime of the material forming the duct. Additionally, the U-shaped geometry reduces the distance between the thermal energy storage layer 200 and any energy recovery device that is connected to energy storage and retrieval system 1000 as compared to a single straight system as the thermal energy storage layer 200 may be configured to overlie both the legs of the U-shaped geometry.

As would be appreciated, other configurations may be adopted depending on requirements including a straight pass through ducting configuration as described above. In another example, the duct geometry may have a square-ended U-shaped configuration. In yet another example, the duct geometry may adopt a serpentine path below the thermal energy storage layer 200.

In one illustrative embodiment, the heat transfer fluid may be an inert gas such as nitrogen, helium or argon or equivalent. As a result, and similar to the box portion 510 and chamber 120, the thermal energy retrieval layer 300 can operate as a substantially sealed system. As the thermal energy retrieval layer 300 is effectively separated from the heat generating and thermal storage layers 100, 200 with the thermal storage layer 200 also separating the thermal energy retrieval layer 300 from the heat generating layer 100, this part of the system is able to operate at a lower temperature than these layers of the energy storage and retrieval system 1000.

The duct input 322 and duct output 323 each has an associated valving arrangement 340 operable to variably adjust the flow of heat transfer fluid through duct 321. In this embodiment, the valving arrangement 340 includes an input high temperature butterfly valve 342 and an output high temperature butterfly valve 343. Each of the butterfly valves 342, 343 is manufactured from a honey-combed graphite board with a central graphite rod that extends from the base portion 520 and which is connected to an actuator motor and in this example is controlled to be either open or shut. Valves 342, 343 in the closed state effectively seal the circulation arrangement 320 and prevent movement of heat transfer fluid through duct 320 in order to thermally isolate energy storage and retrieval system 1000 from any energy recovery system and further in this embodiment function to block radiative heat transfer from system 1000.

To further assist the transfer and retrieval of heat energy from the thermal energy storage layer 200, the heat conduction arrangement 310 includes a number of heat conduction members 312 in the form of cylindrically formed graphite rods that in this embodiment extend vertically from the graphite plate 311 to the floor of the circulation duct 321. In this illustrative embodiment, the cylindrical graphite rods 312 are arranged to also induce turbulence in flow of the heat transfer fluid which assists in the uptake of thermal energy from the thermal energy storage layer 200 by the heat transfer fluid as compared to a laminar flow. While in this example cylindrical graphite rods 312 are employed due to the high thermal conductivity of the graphite and good surface area properties of the cylindrical geometry, in other embodiments a heat conduction member 312 or members having other suitable configurations may be employed.

As an example, the heat conduction members may be formed having a constant cross section such as hexagonal or other n-sided polygon, or of a tapered cross section such as an inverted conic rod or rectangular frustum to balance the heat loading through the heat conduction member 312. In another embodiment, the heat conduction member 312 may be a combination of geometries such as an initial rod portion that then terminates in a spherical portion.

Figure 5:
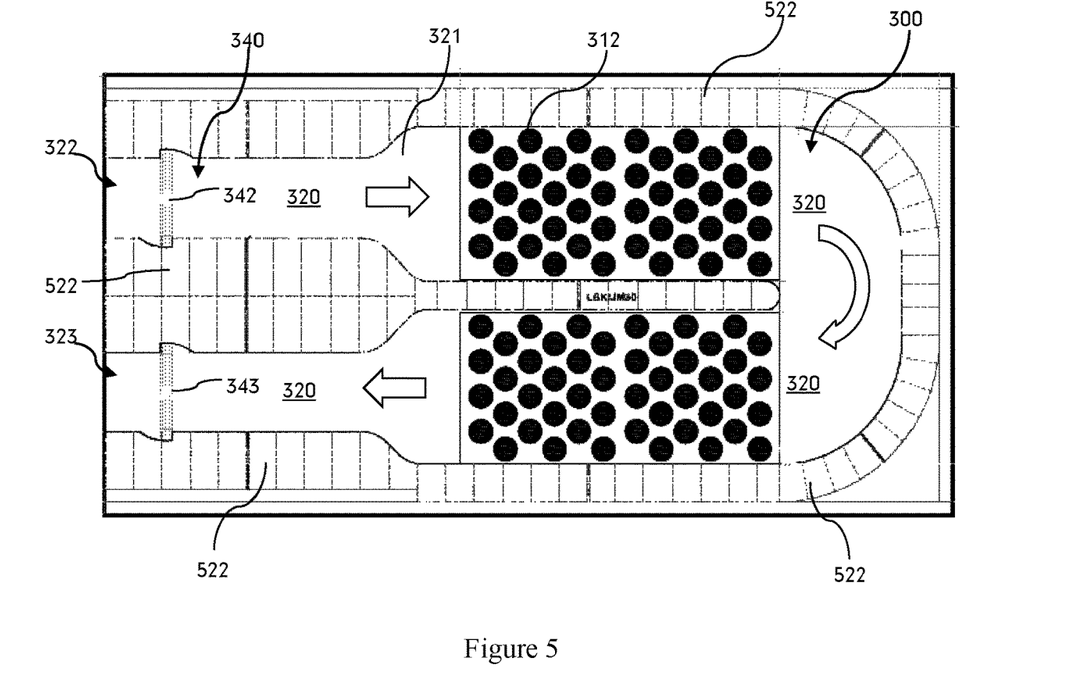
FIG. 5 is a top sectional view of the energy storage and retrieval system illustrated in FIG. 1 through section 5-5.
Figure 6:
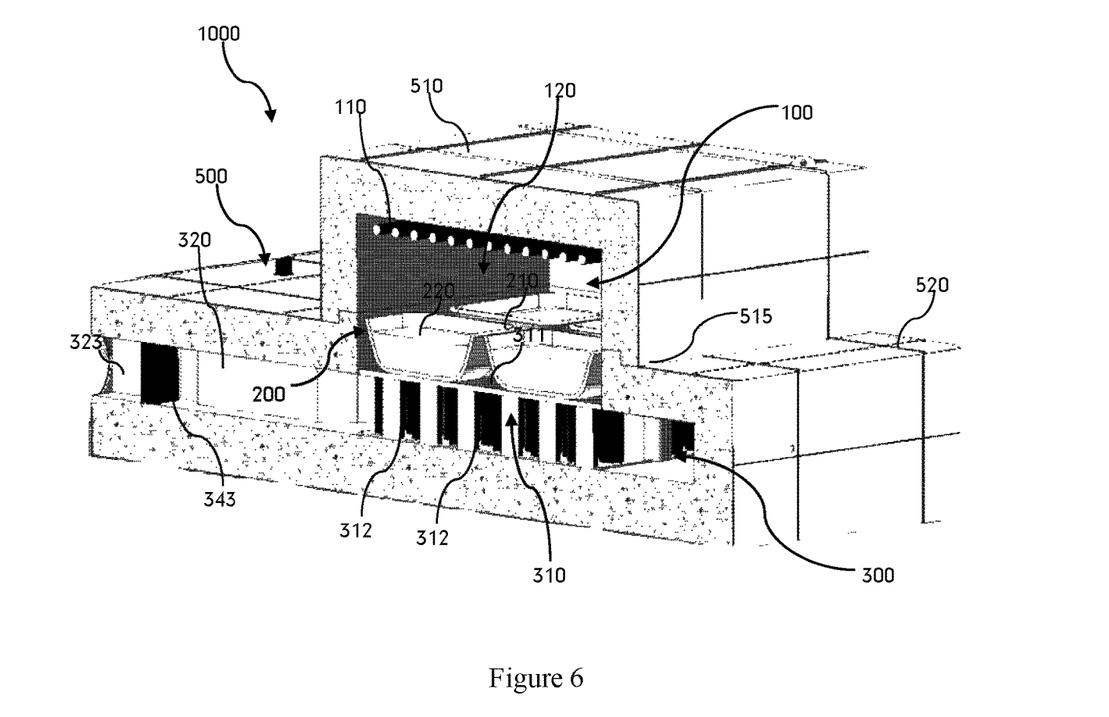
FIG. 6 is a figurative side sectional perspective view of the energy storage and retrieval system illustrated in FIG. 1.

In terms of overall configuration, the heat conduction arrangement 310 may include, but not be limited to:
- an aligned matrix of heat conduction members;
- a staggered matrix of heat conduction members for improved turbulence as shown in FIG. 5;
- uniformly spaced heat conduction members;
- non-uniformly spaced heat conduction members;
- heat conduction members which may be in contact with each other (eg, where the heat conductions members are spherical); or
- any combination of the above.

In one example, the surface of the heat conduction member is roughened to increase turbulence in the flow of the heat transfer fluid to improve the uptake of thermal energy from the thermal energy storage layer 200. This roughening may be uniform or non-uniform depending on the desired flow characteristics of the heat transfer fluid. As would be appreciated, increasing the turbulence in the heat transfer fluid will result in an associated pressure drop which may necessitate a more powerful fan to drive the heat transfer fluid.

In overview, energy storage and retrieval system 1000 operates in three fundamental modes comprising a storage mode where input electrical energy is converted into thermal energy by the heat generating layer 100. In this embodiment, the thermal energy is in the form of radiative heat which causes a phase transition of the thermal energy storage material 220 of the thermal energy storage layer 200 to store the thermal energy. The second mode is a retrieval mode where the stored thermal energy in the thermal energy storage layer 200 is released and retrieved by the thermal energy retrieval layer 300 by a heat conduction arrangement 310 and a fluid circulation arrangement 320 which allows a heat transfer fluid to circulate in the thermal energy retrieval layer 300 to absorb and retrieve the released thermal energy from the thermal energy storage layer 200.

The third mode is a combined storage/retrieval mode where both input electrical energy is converted into thermal energy for heating of the thermal energy storage material 200 and concurrently heat transfer fluid is circulating in the thermal energy retrieval layer 300 at a lower temperature to retrieve heat released from the thermal energy storage layer 200.

Energy storage and retrieval system 1000 in this embodiment includes a number of sensors to assist in the operation of the system. These include temperature sensors to ensure that the working environment and heat transfer fluid do not exceed the operating temperatures of the surrounding components. In addition to temperature sensors, system 1000 further includes one or more pressure sensors to determine the pressure and flow rate of the heat transfer fluid as it circulates in the thermal energy retrieval layer 300. As would be appreciated, the various sensors are interfaced to an electronic control system which also manages the powering of the electrical heating elements 110, eg, gradual heating to reduce thermal shock, and the operation of the input and output valves 322, 323.

The Applicants have found that by generally disposing the heat generating layer 100 above or on top of the thermal energy storage layer 200 and further having the thermal energy storage layer 200 being disposed above or on top of the thermal energy retrieval layer 300 that this layered arrangement encourages the thermal energy storage material 220 to solidify preferentially from the bottom up and as a result further minimises the stresses on the containers 210. In addition, by separating the thermal energy retrieval layer 300 in a separate layer from the thermal energy storage layer 200 and the heat generating layer 100, this allows the use of low temperature materials for this portion of the system 1000 which significantly reduces cost and design complexity and allows this portion of energy storage and retrieval system 1000 to be tailored or configured for the energy recovery system.

While the above embodiment has been described where the thermal energy storage material 220 is silicon, other phase change materials may also be adopted. In one example, the thermal energy storage material 220 is a eutectic material. In a further example, the eutectic material is a silicon based eutectic material. Examples of silicon based eutectic materials include, but are not limited to:
- Aluminium-Silicon-Nickel (Al—Si—Ni) eutectic having a melting point of approximately 1079° C., this material having a stable oxide layer and further which does not expand on solidification;
- Iron-Silicon (Fe—Si) eutectic comprising in this example of 50% silicon and having a corresponding melting point of approximately 1202° C.; and
- Copper-Silicon (Cu—Si) eutectic comprising in this example of 45% silicon and having a melting point of approximately 1200° C.

As would be appreciated, the impact of lower melting point or reactivity of the thermal energy storage material 220 on system design is to reduce the complexity and cost of the system as generally the system may be constructed from materials having less heat resistant or high temperature stability properties. As an example, high grade silicon carbide is required for a silicon thermal energy storage material container as compared to a suitable eutectic where more cost effective container materials like alumina, mullite, silica, or lower grades of silicon carbide may be employed and even potentially high grade steels for eutectics having lower melting temperatures of 1000° C.-1100° C.

Eutectics that have a substantially invariant volume as they pass through the phase transition and in particular which do not expand as they solidify such as silicon will allow for less constrained container geometries to be employed due to the reduction of stresses being applied to the container. In this case, container configurations such as circular canisters, trays, straight wall containers may be employed. Further, the conduction members 312 forming part of the heat conduction arrangement 310 may be modified such as by coring or drilling out a chamber to receive the thermal energy storage material 220 to further reduce thermal losses in the system.

For eutectics having a suitable melting temperature of less than approximately 1100° C., high grade steel such as high temperature stainless steel 253MA may be employed in the heat conduction arrangement 310. In one example, the heat conduction members 312 may be formed as ribs or fins that extend into the circulation duct. These ribs or fins may adopt the following configurations including, but not limited to:

- aligned with the direction of flow of the heat transfer fluid (ie, low turbulence);
- angled to the direction of flow of the heat transfer fluid (ie, more turbulence);
- alternating angles to cause turbulent mixing of the heat transfer fluid;
- perpendicular to the direction of flow of the heat transfer fluid (ie, transverse turbulence); or
- any combination of the above.

In another example, the entire thermal energy retrieval layer 300 may be formed from a high grade steel. In this embodiment, the fluid circulation arrangement 320 would be formed as a unitary steel ducting arrangement which due to its thermal properties will also function to conduct heat from the thermal energy storage layer 200 to the heat transfer fluid. As would be appreciated, the steel ducting arrangement may be configured to cause the heat transfer fluid to adopt a circuitous path to maximise the heat transfer area as well as to invoke some turbulence in the heat transfer fluid. In another embodiment, the steel ducting arrangement may be formed to accommodate a heat transfer fluid operating at an elevated atmospheric pressure where this may be required.

As would be appreciated, the physical characteristics and operation of the circulating heat transfer fluid such as its pressure, temperature and constituents may be chosen depending on the type of energy recovery device (ERD) which operates to convert the thermal energy from the heat transfer fluid into mechanical or electrical energy or alternatively to use the thermal energy directly, eg, for heating purposes.

Figure 7:
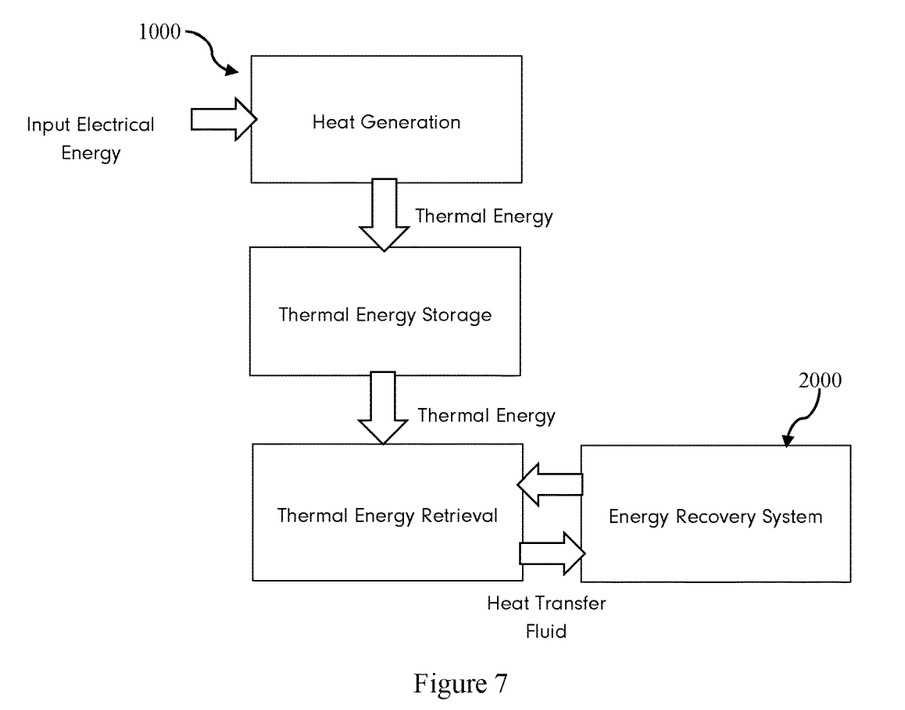
FIG. 7 is a system overview diagram of a combined energy recovery system and energy storage and retrieval system in accordance with an illustrative embodiment.
Figure 8:
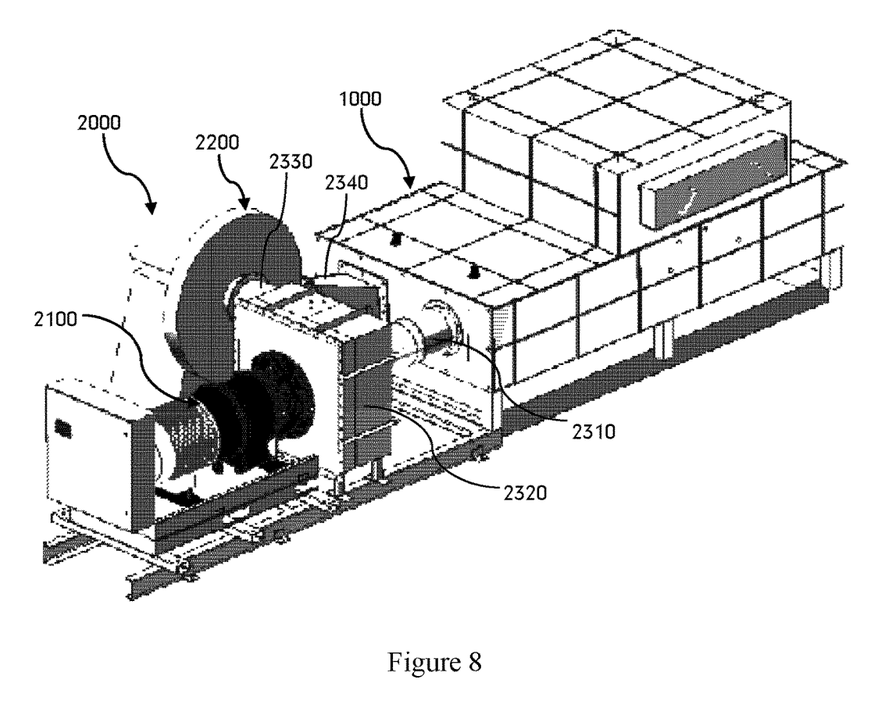
FIG. 8 is a top perspective view of an energy recovery system combined with the energy storage and retrieval system illustrated in FIGS. 2 to 6 in accordance with another illustrative embodiment.
Figure 9:
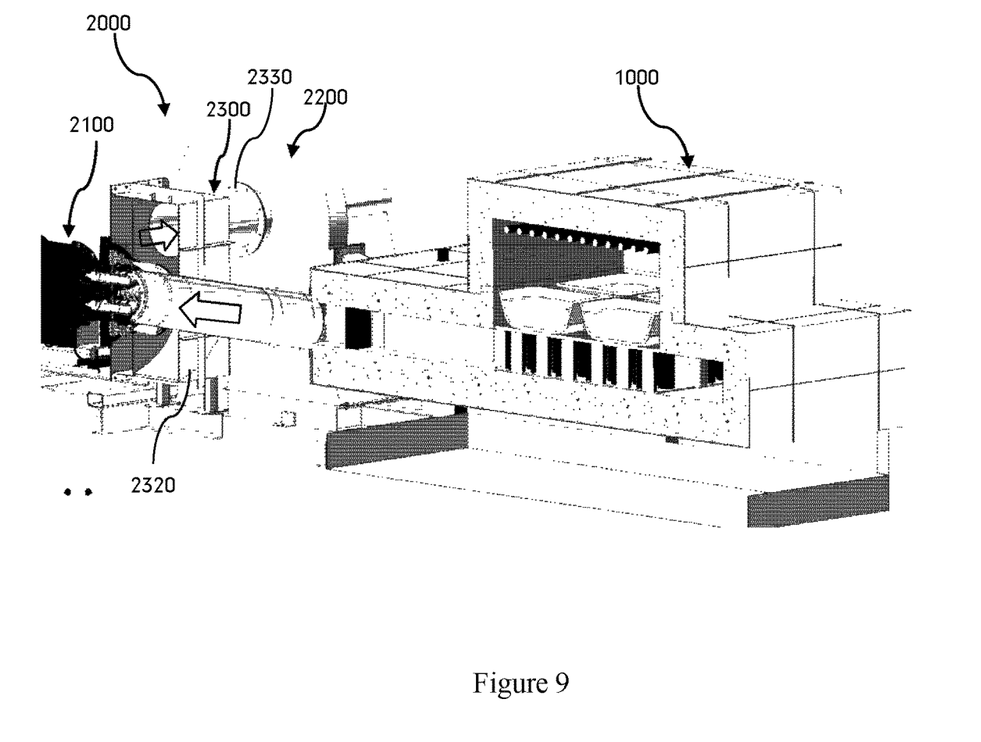
FIG. 9 is a perspective sectional view of the system illustrated in FIG. 8.
Figure 10:
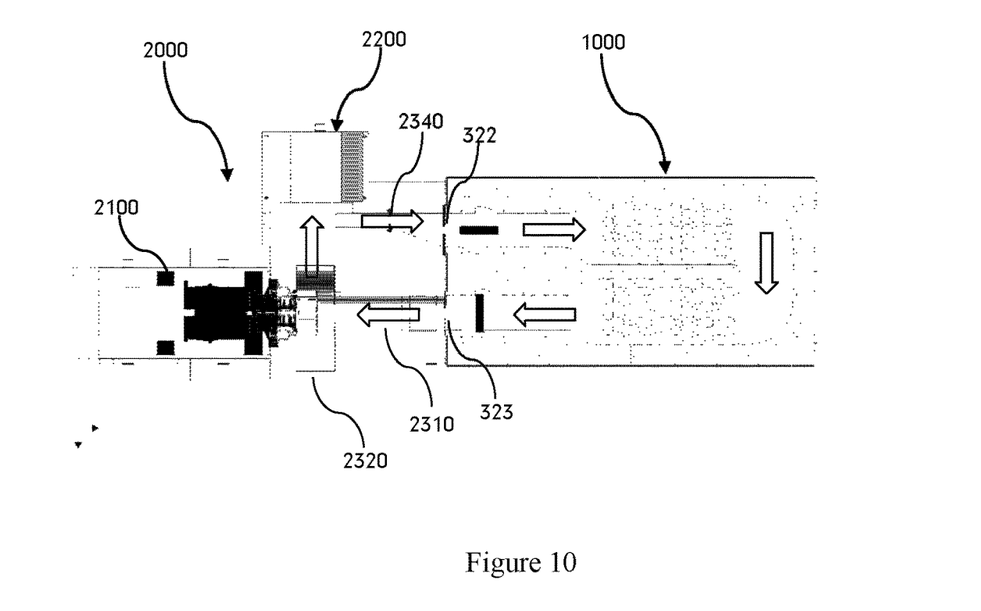
FIG. 10 is a top sectional view of the system illustrated in FIG. 8.
Figure 11:
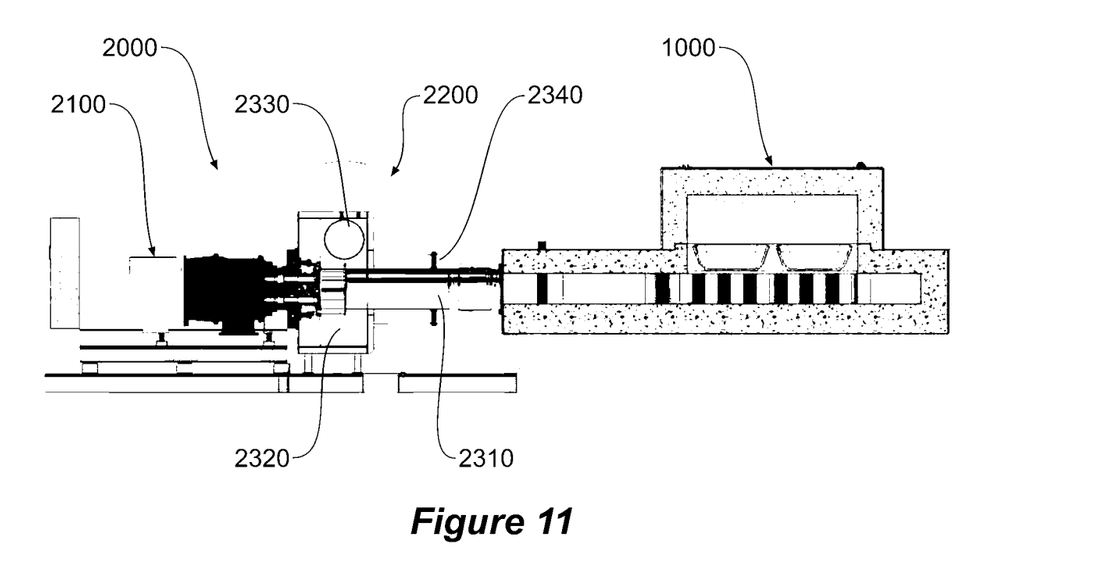
FIG. 11 is a side sectional view of the system illustrated in FIG. 8.

Referring now to FIG. 7, there is shown a system overview of a combined energy recovery system 2000 and energy storage and retrieval system 1000 according to an illustrative embodiment. In this embodiment, energy recovery system 2000 receives the heat transfer fluid conveying the released thermal energy from energy storage and retrieval system 1000 when operating in the retrieval mode and recovers this thermal energy. The cooled heat transfer fluid is then circulated to be received by the energy storage and retrieval system 1000 where any residual heat in the heat transfer fluid is fed back into the energy retrieval layer supplementing further heating and repetition of the energy retrieval cycle.

Referring now to FIGS. 8 to 11, there are shown various views of an energy recovery system 2000 combined with the energy storage and retrieval system 1000 illustrated in FIGS. 2 to 6 according to another illustrative embodiment.

In this embodiment, energy recovery system 2000 comprises an energy recovery device 2100, fluid circulating means 2200 and an associated ducting assembly 2300 which in combination with the energy storage and retrieval system 1000 is configured to circulate the heat transfer fluid through both systems 1000, 2000. In this illustrative embodiment, the energy storage and retrieval system 1000 is configured to operate with an energy recovery system 2000 incorporating an energy recovery device 2100 in the form of a Stirling engine based on the Stirling power cycle which in this example is a multi-cylinder Alpha variant. In this embodiment, the heat transfer or working fluid is an inert gas such as nitrogen, helium, argon or equivalent.

Ducting assembly 2300 includes an energy recovery device input duct 2310 which is connected to the duct output 323 of the energy storage and retrieval system 1000 to receive the heat transfer fluid which then flows through an energy recovery device housing or cowling 2320 which directs heat transfer fluid to the energy recovery device 2100 in the form of a Stirling engine, and includes a bypass valve and ducting 2330 to transfer heat transfer fluid to the fluid circulating means 2200. In this way, heat flow to the Stirling engine can be controlled to maintain optimum operating conditions within the energy storage and retrieval system 1000 as matched to the input requirements of the energy recovery device 2100 in the form of the Stirling engine. Throughout both systems, silicon carbide mortar may be used for joining sections of ductwork to provide the appropriate sealing.

In this illustrative embodiment, fluid circulating means 2200 is a variable speed high temperature fan with its output connected to the duct input 322 of energy storage and retrieval system 1000 by a circulating means output duct 2340 which is sized and shaped to compensate for the difference in dimensions between the fan outlet and input duct 2310 to preserve the required flow conditions. In this embodiment, high temperature fan 2200 is located after energy recovery device 2100 where the working fluid is at its lowest temperature and as a result the fan is subjected to less stress and thermal fatigue. In this illustrative embodiment, high temperature fan 2200 is a centrifugal fan including a variable speed drive which is controllable to adjust the flow rate of thermal energy through the combined system 1000, 2000 and as a consequence the output temperature from fan 2200 and the energy recovery rate. As would be appreciated, other types of fans, or combination of fans, such as a high temperature axial fan may be employed.

Figure 12:
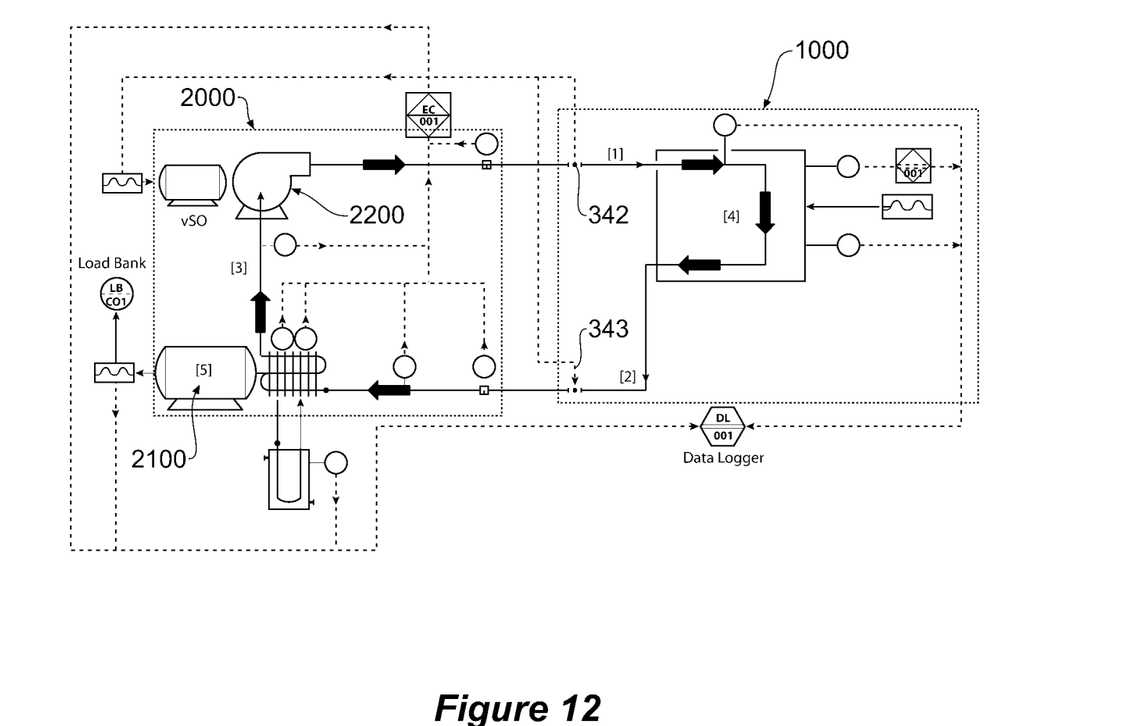
FIG. 12 is a system overview diagram of the system illustrated in FIG. 8.

Referring now to FIG. 12, there is shown a system overview diagram of the combined system 1000, 2000 as illustrated in FIGS. 8 to 11 which illustrates schematically how the energy flows around the combined system and how the sub-systems interact. The solid arrowed lines represent the flow of heat transfer fluid and the dashed lines represent the direction of communication of the sensors, controller and data logger.

In operation, 350 kg of silicon may be used in energy storage and retrieval system 1000 as the thermal energy storage material 220. Heat generating section 100 has a heating capacity of 60 kW and in this example takes approximately 8 hours to heat the silicon from ambient temperature to the phase transition temperature. As would be appreciated, this time will be dependent on thermal losses in the heat generating section 100 as well as the available heating power capacity.

When the silicon is melted, there is approximately 175 kWh of latent heat stored in the thermal energy storage section 200 and an extra approximately 20 kWh of sensible heat by operating from 1450° C. to 1350° C. for a total of 195 kWh.

System 1000 will be subject to a background heat loss which at the operating temperature may range from 22 kWh-25 kWh. There will also be some minimal additional heat loss in the thermal energy retrieval system 300 with the remaining thermal energy then available for the energy recovery system 2000. In this example, approximately 100 kW of thermal power is required to operate the energy recovery device 2100 which in this embodiment is a Stirling engine which will also include an outlet direct heat component from the radiator of the Stirling engine which is then available for further use.

It follows that the system 1000 in this configuration will provide approximately 1.5 hours of operation of the energy recovery device 2100 of the energy recovery system 2000. In another embodiment, the thermal energy storage material is an Al—Si—Ni eutectic with the main difference compared to silicon being the weight of the material which for the same physical volume is 700 kg as opposed to 350 kg of silicon to achieve the same stored energy.

An important advantage of the above described energy storage and retrieval system 1000 is the ability to scale the system readily to increase the amount of energy which may be stored and then retrieved.

Figure 13:
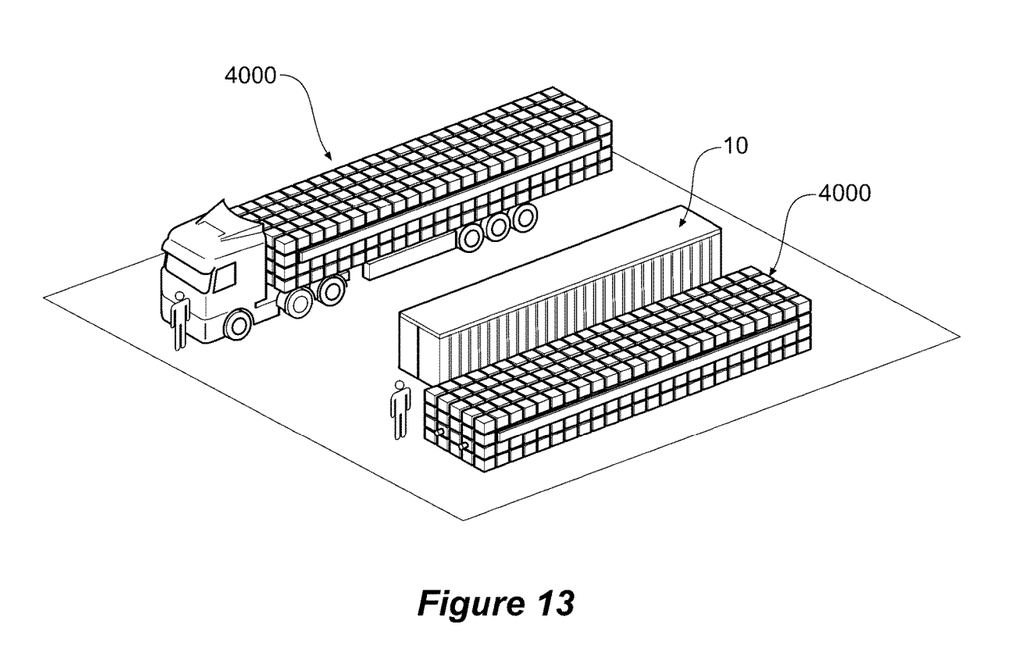
FIG. 13 is a figurative view of an energy storage and retrieval system in accordance with another illustrative embodiment.

Referring now FIG. 13, there is shown a figurative view of a 10 MWh energy storage and retrieval system 4000 based on an increase in the amount of thermal energy storage material 220 to 20 tonnes in the case of silicon or 40 tonnes in the case of an Al—Si—Ni eutectic for the same volume of material. In this embodiment, and as can be seen in FIG. 13, system 4000 is configured as a modular unit having substantially the same the form factor as a 40 foot shipping container 10 (ie, rectangular prism) although the exact dimensions will vary according to requirements. As would be appreciated, this form factor facilitates the transportation and deployment of system 4000.

Figure 14:
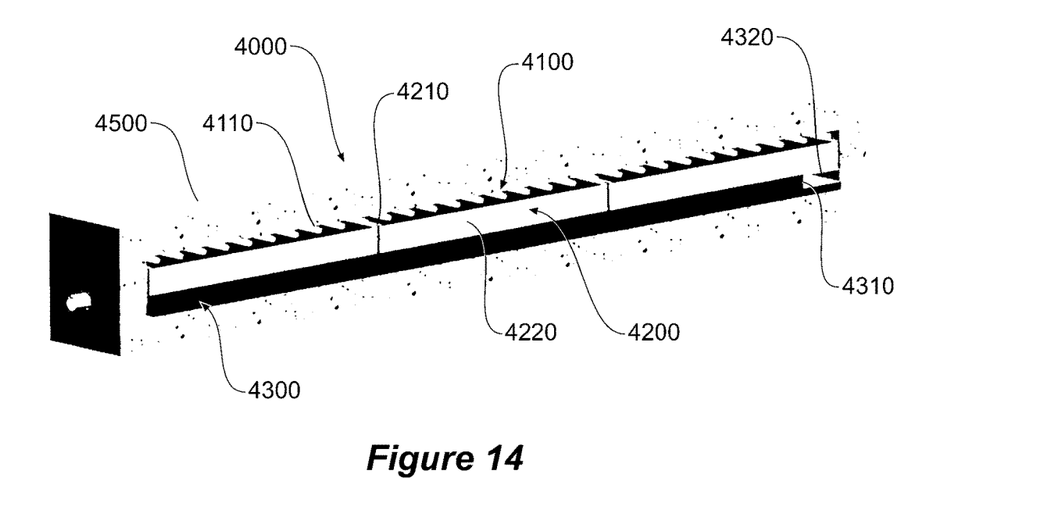
FIG. 14 is a perspective sectional view of the energy storage and retrieval system illustrated in FIG. 13.
Figure 15:
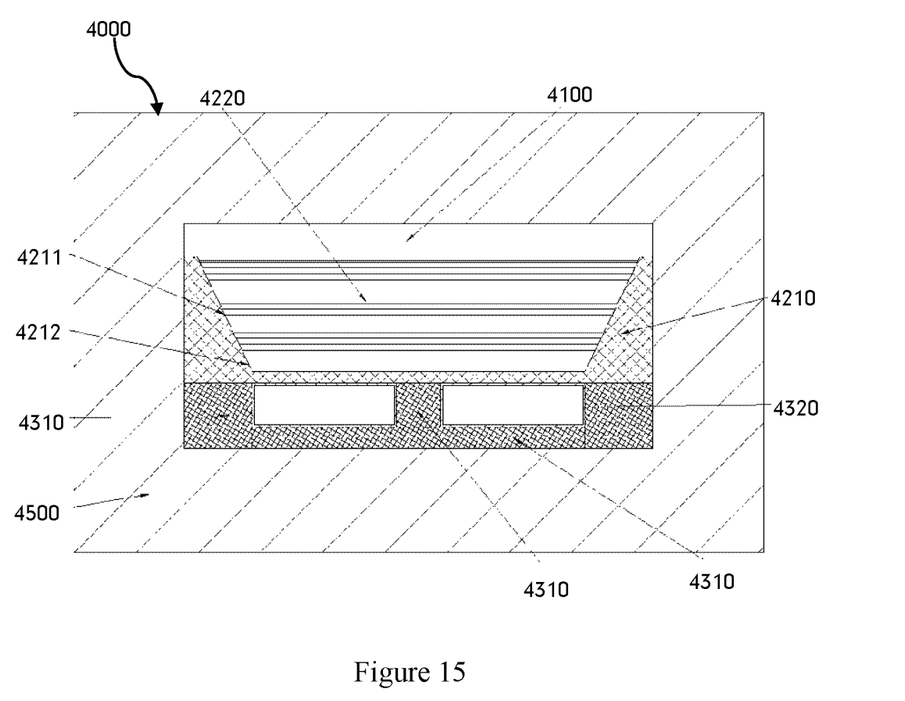
FIG. 15 is a sectional end view of the energy storage and retrieval system illustrated in FIG. 13.

Referring now to FIGS. 14 and 15, there is shown is a perspective and end sectional views of system 4000 depicting the heat generating layer 4100 consisting of transversely arranged heating elements 4110 (not shown in FIG. 15) arranged along assembly structure 4500 which is formed of a suitable heat resistant material; the thermal energy storage layer 4200 consisting of three open-ended containers 4210 each containing thermal energy storage material 4220 and incorporating a graphite liner 4211 and sloped walls 412; and the thermal energy retrieval layer 4300 consisting of a heat conducting arrangement 4310 and a fluid circulation arrangement 4320 in the form of a thermally conductive block having a circulation duct. In this embodiment, each of the layers 4100, 4200, 4300 occupies substantially the entire length of the assembly structure 4500.

In this example, and on the assumption of 500 kW of heating power it would take approximately 15-20 hours to heat the thermal energy storage material 4220 from an ambient temperature to the beginning of the latent heat transition phase (recoverable as sensible heat) and then a further 20 hours of heating to complete the phase transition of the thermal energy storage material 4220 (recoverable as latent heat). This heating time would reduce substantially in line with an increase in heating capacity, ie a doubling of heating capacity to 1 MW will to a good approximation reduce the heating time by a factor of two.

Taking as an example, 40 tons Al—Si—Ni eutectic material as the thermal energy storage material 4220, then the full charge energy is approximately 10 MWh for the Al—Si—Ni eutectic material to undergo the phase change at 1150° C. If thermal energy storage material 4220 is allowed to cool to 1000° C. in energy retrieval mode then approximately 10 MWh+1 MWh is released and is available for energy recovery.

In one example, the energy recovery system requires an equivalent input power of 200 kW and operates at 30% efficiency. In this example, approximately 600 kW-700 kW (thermal) is then required to produce 200 kW (electrical) with 400 kW-500 kW of waste heat where a proportion of that waste heat may be recovered for use as useable waste heat. On this basis, if there is a total of 11 MWh of useable stored energy (including sensible heat), an approximate discharge time would be 11,000 kWh/700 kW=15.7 hours.

In another embodiment, energy recovery system 2000 is based on a turbine arrangement. In one example, the energy storage and retrieval system 1000, 4000 is configured to receive the heat transfer fluid at high pressure, heat the heat transfer fluid and then deliver the heat transfer fluid at the required temperature, pressure and flow rate for use as the working fluid for in this case a gas turbine. In this example, a substantially sealed steel based thermal energy retrieval section such as described above may be adopted to contain the pressure as the heat transfer fluid circulates the thermal energy retrieval section. In this example, the heat transfer fluid, typically in the form of compressed air, would be delivered to the gas turbine based energy recovery system at a temperature in the range of 600° C.-900° C. and a pressure range of 4-10 bar. In another example, the heat transfer fluid at standard operating pressure would be introduced into a separate heat transfer arrangement having its own heat exchanger to transfer heat from the heat transfer fluid to the high pressure working fluid of the gas turbine.

In one example embodiment, the gas turbine arrangement may be operated in an open loop configuration where external air is employed as the heat transfer fluid which is then conveyed through the energy storage and retrieval system and then subsequently vented from the gas turbine back into the atmosphere. Alternatively, the gas turbine arrangement may also be operated in a closed loop configuration where the vented air output from the gas turbine is circulated back to the air input of the energy storage and retrieval system to take advantage of any residual heat and/or pressure.

Other types of turbine arrangements may also be adopted in combination with energy storage and retrieval system 1000 such as steam turbines or combinations of different turbines arrangements depending on efficiency requirements.

In another embodiment, energy recovery system 2000 further includes an additional conventional energy supply system to supplement the recovered energy where there may be a higher demand or as a standby/backup system when the stored energy from energy storage and retrieval system 1000 is exhausted or undergoing maintenance. As would be appreciated, the type of conventional supply system employed will depend on requirements and may include, but not be limited to:

electricity grid backup;
diesel generation capacity;
micro-grid based on renewable and/or non-renewable combination (eg, wind, solar, photovoltaic, diesel, etc);
conventional battery storage (eg, lithium, lead acid, etc);
thermal and/or non-thermal waste to energy systems;
gas boilers for heat; or
any combination of the above.

As discussed above, the combined energy recovery system 2000 and energy storage and retrieval system 1000 illustrated in FIGS. 6 to 10 relates to a closed loop system. As described above, in other embodiments, energy storage and retrieval system 1000 may be configured to operate in an open loop system.

As would be appreciated, the example systems described above may be scaled to any suitable size including a grid level energy storage and retrieval system capable of storing and retrieving 200 MWh. In addition, the example systems described above because of their modular design may be arranged in parallel or series or a combination of parallel and series arrangements depending on the storage requirements to provide storage and retrieval capacity of multiple GWh.

In this manner, these systems are well suited to addressing the energy storage requirements of renewable energy sources where this inherently intermittent energy source may be stored and retrieved as required to assist in meeting baseload demand either within the standard electricity grid distribution architecture (ie, storage of several hundred MWh and electrical power output of 50 MW) to smaller scale systems (ie, storage of two MWh and electrical power output 10 kW).

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. An energy storage and retrieval system comprising:
a heat generating layer for generating thermal energy based on input electrical energy;
a thermal energy storage layer disposed below the heat generating layer and located to receive thermal energy from the heat generating layer, the thermal energy storage layer including a thermal energy storage material to store thermal energy, wherein the thermal energy storage layer includes one or more open-topped containers for containing the thermal energy storage material to allow heating from above, and wherein the thermal energy storage material is a high temperature phase change material that expands and on cooling from a molten state, and wherein the one or more containers are configured to encourage the high temperature phase change material to expand upwards on cooling; and
a thermal energy retrieval layer disposed below the thermal energy storage layer so that the heat generating layer and the thermal energy retrieval layer are separated by the thermal energy storage layer, the thermal energy retrieval layer thermally connectable to the thermal energy storage material and configured to promote cooling of the thermal energy storage material from a base region of the one or more open-topped containers so that solidification of molten thermal energy storage material occurs preferentially at the base region of one or more open-topped containers to retrieve thermal energy from the thermal energy storage layer.

2. The energy storage and retrieval system of claim 1, wherein the heat generating layer, the thermal energy storage layer and the thermal energy retrieval layer form substantially parallel layers with respect to each other.

3. The energy storage and retrieval system of claim 1, wherein the heat generating layer includes one or more resistive heating elements.

4. The energy storage and retrieval system of claim 1, wherein the thermal energy retrieval layer is configured to operate at a lower temperature than the thermal energy storage layer.

5. The energy storage and retrieval system of claim 4, wherein the thermal energy retrieval layer includes a heat conduction arrangement to conduct heat from the thermal energy storage layer and a fluid conveying arrangement for conveying heat transfer fluid to retrieve the heat conducted from the heat conduction arrangement.

6. The energy storage and retrieval system of claim 5, wherein the fluid conveying arrangement is a fluid circulation arrangement for circulating heat transfer fluid to retrieve the heat conducted from the heat conduction arrangement.

7. The energy storage and retrieval system of claim 5, wherein the heat conduction arrangement is configured to induce turbulence in a flow of the heat transfer fluid.

8. The energy storage and retrieval system of claim 7, wherein the heat conduction arrangement includes a plurality of heat conduction members that in operation extend into the moving heat transfer fluid.

9. The energy storage and retrieval system of claim 1, wherein the thermal energy storage material is silicon.

10. The energy storage and retrieval system of claim 1, wherein the thermal energy storage material is a eutectic material.

11. The energy storage and retrieval system of claim 10, wherein the thermal energy storage material is a silicon based eutectic material.

12. The energy storage and retrieval system of claim 11, wherein the silicon based eutectic material is Aluminium-Silicon-Nickel eutectic.

13. The energy storage and retrieval system of claim 1, wherein the system operates in a storage mode, and wherein electrical energy is input into the heat generating layer to generate thermal energy to heat the thermal energy storage material of the thermal energy storage layer to store the thermal energy.

14. The energy storage and retrieval system of claim 13, wherein the system operates in a retrieval mode, and wherein the thermal energy retrieval layer is configured to operate at a lower temperature than the thermal energy storage material to conduct heat from the thermal energy storage material.

15. The energy storage and retrieval system of claim 14, wherein the system operates in a storage/retrieval mode wherein electrical energy is input into the heat generating layer to generate thermal energy to heat the thermal energy storage material of the thermal energy storage layer to store the thermal energy and wherein concurrently the thermal energy retrieval layer is configured to operate at a lower temperature than the thermal energy storage material to conduct heat from the thermal energy storage material.

16. The energy storage and retrieval system of claim 1, further including an energy recovery system to recover the retrieved thermal energy.

17. The energy storage and retrieval system of claim 16, wherein the energy recovery system and the energy storage and retrieval system operate together in a closed loop system.

18. The energy storage and retrieval system of claim 17, wherein the system includes a fluid circulating means to circulate a heat transfer fluid.

19. The energy storage and retrieval system of claim 16, wherein the energy recovery system includes a Stirling engine.

20. The energy storage and retrieval system of claim 16, wherein the energy recovery system includes a turbine arrangement.

21. A method for storing and retrieving electrical energy, including converting in a heat generating layer the electrical energy to thermal energy;

storing the thermal energy by heating a thermal energy storage layer disposed below the heat generating layer and located to receive thermal energy from the heat generating layer, wherein the thermal energy storage layer includes one or more open-topped containers for containing a thermal energy storage material, and wherein the thermal energy storage material is a high temperature phase change material that expands and solidifies on cooling from a and state, and wherein the one or more open-topped containers are configured to encourage the high temperature phase change material to expand upwards on cooling; and retrieving the stored thermal energy by thermally connecting the thermal energy storage material to a thermal energy retrieval layer disposed below the thermal energy storage layer, so that the heat generating layer and the thermal energy retrieval layer are separated by the thermal energy storage layer, and wherein the thermal energy retrieval layer is configured to promote cooling of the thermal energy storage material from a base region of the one or more open-topped containers so that solidification of molten thermal energy storage material occurs preferentially at the base region of the one or more open-topped containers when retrieving the stored thermal energy from the thermal energy storage layer.

22. The method for storing and retrieving electrical energy of claim 21, wherein retrieving the stored thermal energy includes operating the thermal energy retrieval layer at a lower temperature compared to the thermal energy storage layer.

23. The method of storing and retrieving electrical energy of claim 22, wherein operating the thermal energy retrieval layer at a lower temperature includes conveying a heat transfer fluid through the thermal energy retrieval layer to retrieve the stored thermal energy from the thermal energy storage layer.

24. The method of storing and retrieving electrical energy of claim 23, wherein conveying a heat transfer fluid through the thermal energy retrieval layer includes circulating the heat transfer fluid through the thermal energy retrieval layer.

25. The method of storing and retrieving electrical energy of claim 21, wherein storing the thermal energy includes causing a phase change in the thermal energy storage material.

26. The method of storing and retrieving electrical energy of claim 21, wherein the steps of storing the thermal energy and retrieving the stored thermal energy occur concurrently.

27. The method of storing and retrieving electrical energy of claim 21, further including recovering the retrieved stored thermal energy.

28. The method of storing and retrieving electrical energy of claim 27, wherein the steps of retrieving the stored thermal energy and recovering the retrieved stored thermal energy operate in a closed loop.

* * * * *

UNITED STATES PATENT AND TRADEMARK OFFICE
CERTIFICATE OF CORRECTION

PATENT NO. : 11,085,705 B2
APPLICATION NO. : 16/494344
DATED : August 10, 2021
INVENTOR(S) : Matthew Johnson et al.

Page 1 of 1

It is certified that error appears in the above-identified patent and that said Letters Patent is hereby corrected as shown below:

In the Claims

Column 17, Line 53, Claim 1, after "and" insert -- solidifies --

Column 19, Line 25, Claim 21, delete "and" and insert -- molten --

Column 19, Line 32, Claim 21, delete "layer," and insert -- layer --

Signed and Sealed this
Eleventh Day of January, 2022

Drew Hirshfeld
*Performing the Functions and Duties of the
Under Secretary of Commerce for Intellectual Property and
Director of the United States Patent and Trademark Office*